United States Patent [19]
D'Agaro

[11] Patent Number: 4,945,977
[45] Date of Patent: Aug. 7, 1990

[54] COMBINATION VEHICLE HEATING AND COOLING SYSTEM

[76] Inventor: Raymond D'Agaro, 1623 NE. 45th St., Fort Lauderdale, Fla. 33334

[21] Appl. No.: 287,543

[22] Filed: Dec. 19, 1988

Related U.S. Application Data

[63] Continuation-in-part of Ser. No. 117,638, Jan. 5, 1987, abandoned.

[51] Int. Cl.⁵ .............................................. B60H 3/00
[52] U.S. Cl. ....................................... 165/43; 62/236; 62/323.3
[58] Field of Search ................. 165/43, 97; 62/323.3, 62/243, 244, 236

[56] References Cited

U.S. PATENT DOCUMENTS

| | | | |
|---|---|---|---|
| 2,743,589 | 5/1956 | Kuempel | 62/243 |
| 3,283,525 | 11/1966 | Fricke et al. | 62/323.3 |
| 4,098,093 | 7/1978 | Czyl | 62/243 |
| 4,125,151 | 11/1978 | Hays et al. | 165/58 |
| 4,540,040 | 9/1985 | Fukumoto et al. | 62/243 X |

FOREIGN PATENT DOCUMENTS 149506  5/1937  Austria ................................ 165/22

Primary Examiner—William E. Wayner
Attorney, Agent, or Firm—Alvin S. Blum

[57] ABSTRACT

An auxiliary air conditioning system mounts beneath the floor of a vehicle and provides heated or cooled air to the passenger interior. It is of modular construction and may be installed in various forms and modified to serve different functions economically. An air handling module circulates vehicle air through various heating and cooling elements including a closed circuit independent refrigerant system, an evaporator coil connected to the engine mounted refrigerant compressor, a heating coil connected to engine coolant circuit and a resistance heater. Various combinations may be arranged to suit requirements and the system is economically modified. The air handling module is direct current powered to operate on vehicle electric system. An A.C. to D.C. converter module permits operatoin from an off the road power source.

10 Claims, 3 Drawing Sheets

COMBINATION VEHICLE HEATING AND COOLING SYSTEM

This application is a continuation-in-part of copending application Ser. No. 117,638 filed 1/5/87, now abandoned.

FIELD OF THE INVENTION

This invention relates to heating and cooling systems for vehicles and more particularly to auxiliary units to provide supplemental heating and cooling in addition to the conventional engine mounted heating and cooling system.

BACKGROUND OF THE INVENTION

The passenger compartments of large motor vehicles including motor homes, vans and the like may not be adequately served by the conventional engine-mounted heating and cooling air conditioning systems. Auxiliary systems to provide supplemental heating and cooling commonly mount on the roof or the rear window where they impede clearance and access. Thomas, U.S. Pat. No. 3,906,740 discloses an under the vehicle mounted air conditioner powered by 115 volts A.C. for off-vehicle power or on-vehicle A.C. generator. D'Agaro, U.S. Pat. No. 4,674,294 discloses a system mounted on the vehicle floor within the vehicle where it occupies space that could be put to better use.

SUMMARY OF THE INVENTION

It is accordingly an object of the present invention to provide a compact and versatile modular assembly for supplying cool or hot air to the passenger compartment that will not occupy useful space within the compartment, that will mount beneath the floor, and that can be used in an economic form with the engine refrigerant system.

It is another object that the system be adapted for off the road use while taking full advantage of on the road systems.

The system of the invention includes an under-floor air handling system run by D.C. power and an evaporator coil in the air handling circuit that connects to the vehicle's engine-mounted refrigerant compressor circuit. A heating coil in the air handling circuit connects to the engine coolant system. The system is expansible to include a third coil in the air handling system that is an evaporator coil in a sealed circuit connected to a compressor and condenser so that cooling can be independent of the engine. This sealed circuit is powered by alternating current (A.C.) such as an ordinary household current source to provide a system for extra cooling. The system includes an A.C. to D.C. converter so that the air handler can be powered by the outside A.C. power source for off the road operation. An auxiliary electric resistance heater in the air handling circuit can provide heating when the engine is not running. This is A.C. powered also.

These and other objects, features and advantages of the invention will become more fully apparent when the following detailed description of the preferred embodiment of the invention is read in conjunction with the accompanying drawings.

DETAILED DESCRIPTION OF PREFERRED EMBODIMENTS

Figure 4:
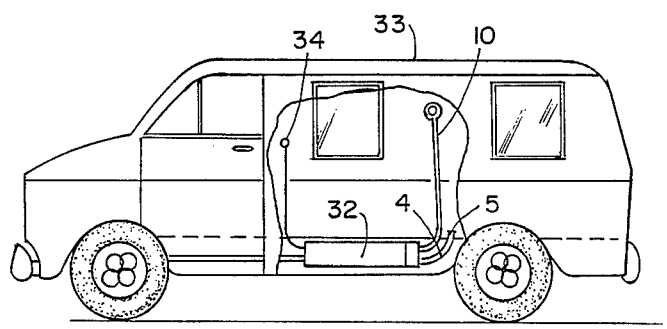
FIG. 4 is a side elevational view of a van equipped with the present invention.

Referring now first to FIG. 4, a van 33 is shown with a portion broken away to reveal the assembly 32 of the invention installed beneath the floor of the passenger compartment. An air intake duct 4 takes air through filter 5 from the passenger compartment through a hole in the floor into assembly 32 where it is heated or cooled and returned through flexible duct 10 via another hole in the floor to the interior of the passenger compartment. Remote thermostat 34 controls temperature of the system by means well known in the art.

Figure 3:
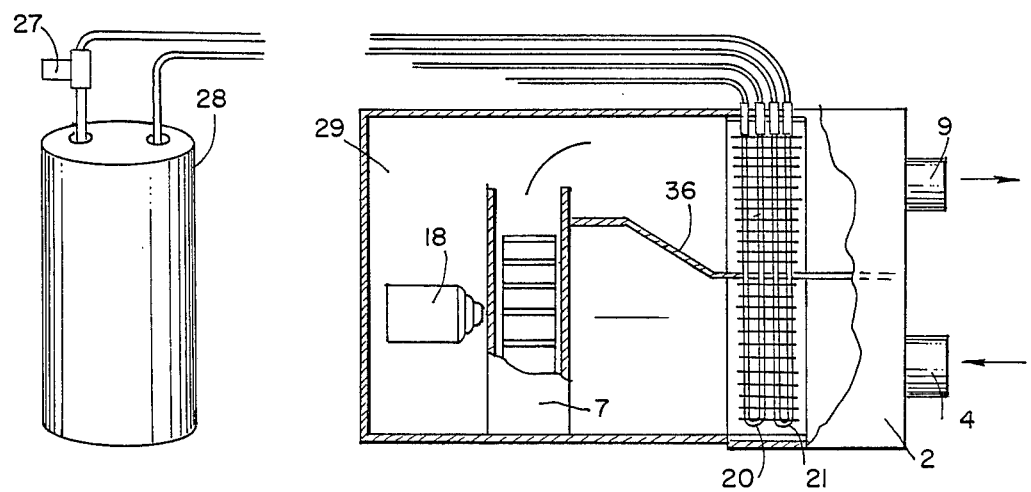
FIG. 3 is a top plan view of the small assembly of the invention employing the engine's refrigerant for cooling and engine coolant for heating.
Figure 5:
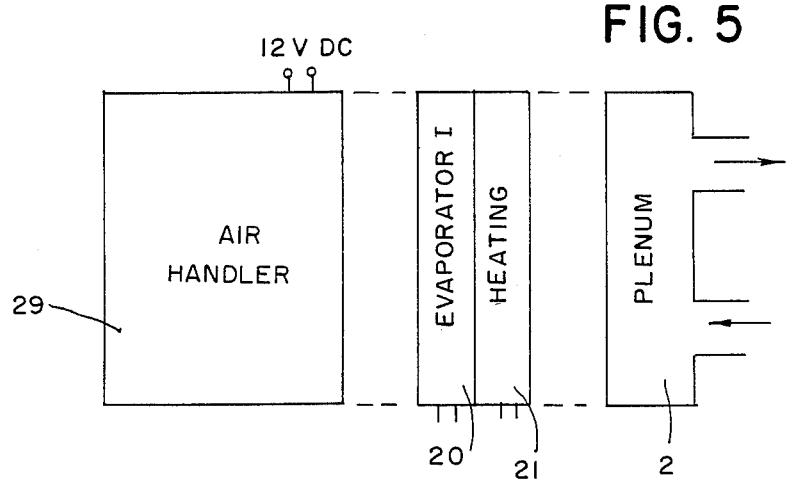
FIG. 5 is an expanded diagrammatic view of the system of FIG. 3.

In the least expensive and simplest embodiment shown in FIGS. 3 and 5, the engine's heating and refrigerating systems are extended by a secondary heating coil 21 connected to engine cooling circuit and secondary evaporator coil 20 connected to engine compressor refrigerant circuit. A D.C. motor 18 drives fan 7 which pulls air from intake duct 4 through plenum chamber 2, across coils 21 and 20 on one side of divider 36, thru blower 7 and back across the coils 20 and 21 on the other side of divider 36 and through output duct 9 into the van. Divider 36 doubles the path length of air past the coils for a compact design necessary to fit the small space beneath the floor.

Figure 1:
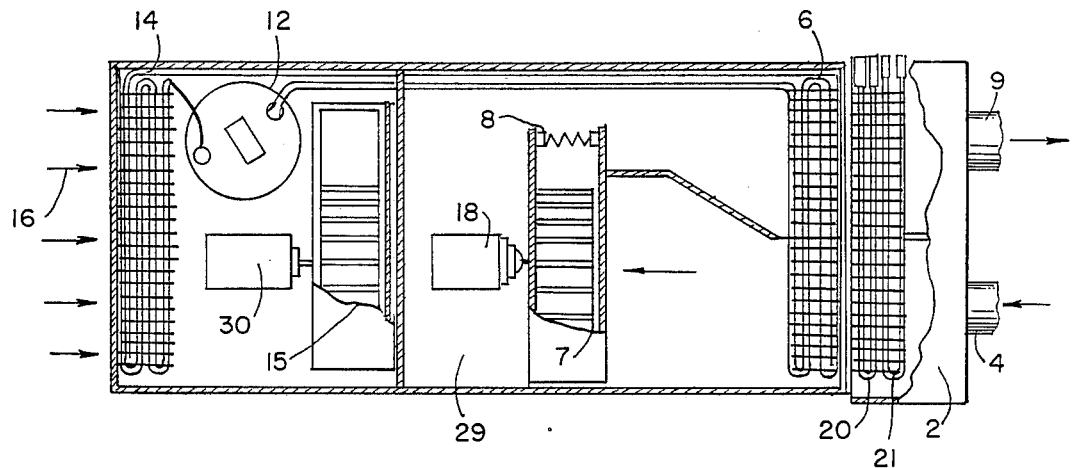
FIG. 1 is a sectional top plan view showing the component parts of the most complete assembly of the invention.
Figure 2:
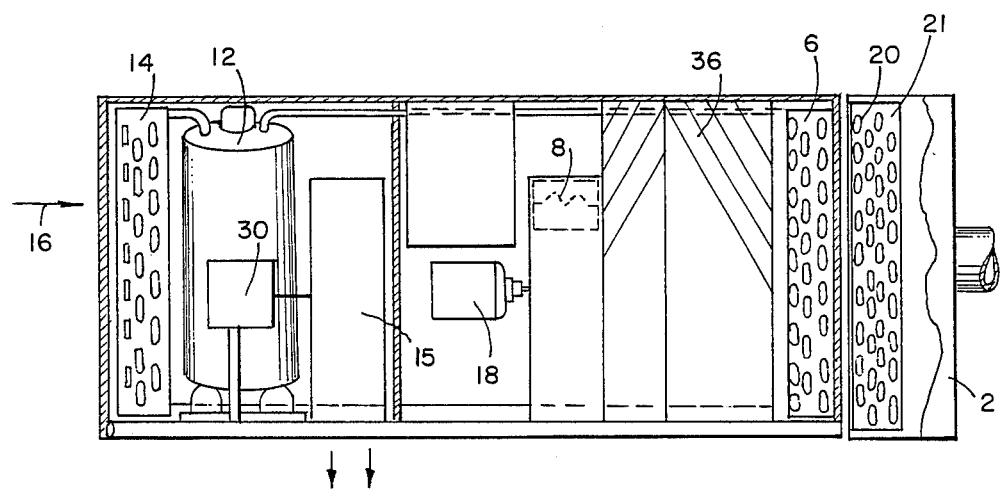
FIG. 2 is a sectional side elevation of the assembly of FIG. 1.
Figure 7:
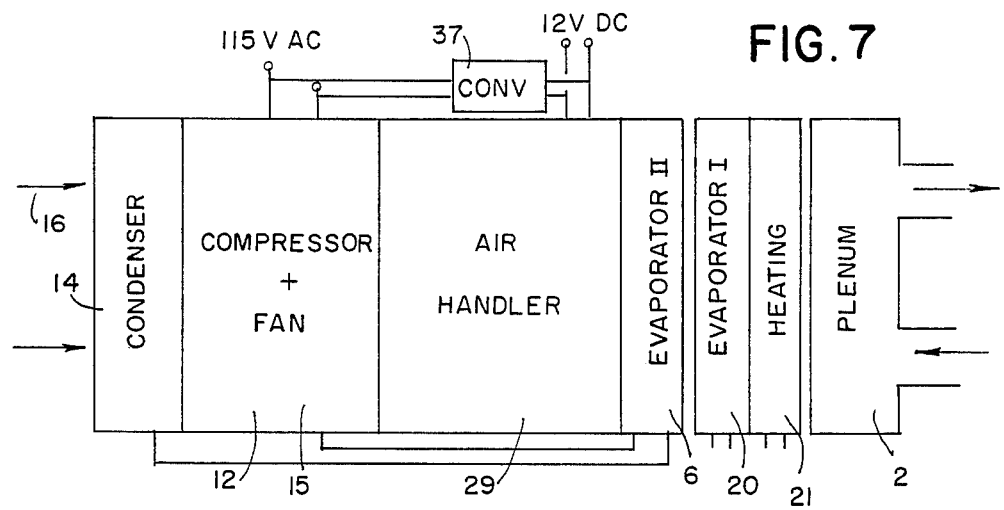
FIG. 7 is a diagrammatic view of the system of FIG. 1.

After installation, a need may arise for off the road air conditioning. The system of FIGS. 3 and 5 may be expanded very economically, retaining the air handling system and coils and adding the hermetically sealed closed circuit system shown as the cabinet 35 of FIG. 6, removing air blower 39 from its position at coil 20 and inserting it into the space 29 of cabinet 35. The cabinet 35 is then fastened in place against coil 20 to complete the assembly shown in FIGS. 1, 2 and 7. Blower 29 now blows air over evaporator coil 6 as well as evaporator coil 20 and heating coil 21. Alternatively, the plenum 2 may be fastened to cabinet 35 as indicated in phantom in FIG. 6 to provide a sealed air conditioning unit isolated from engine units. An electrical resistance heater 8 may provide heat. Alternatively, as shown in FIG. 3, a hot water heater 28 with pump 27 may provide hot water for heating through line 25 and 26.

Figure 6:
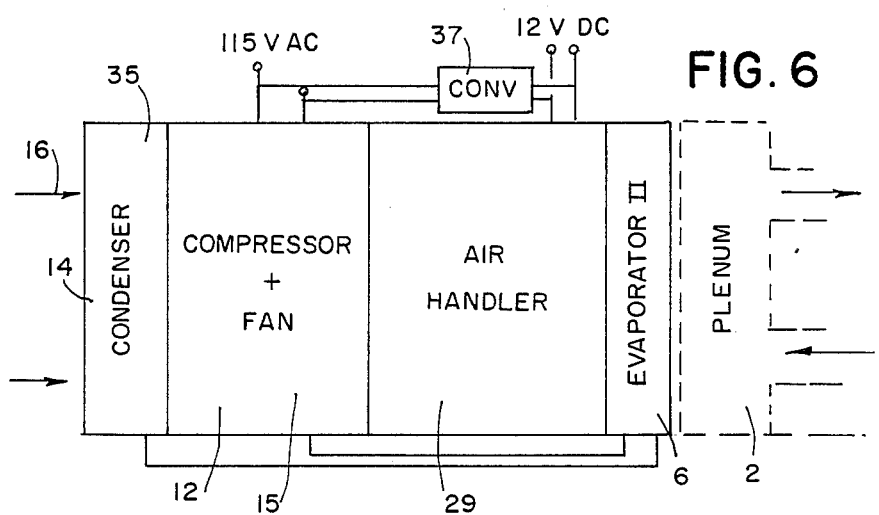
FIG. 6 is a diagrammatic view of a closed circuit assembly of the invention that operates independently of engine mounted systems.

As shown in FIG. 6, the compressor 12 and fan motor 30 operating fan 15 for blowing cooling air 16 past condenser 14 is operated by A.C. power. An input for 115 volt A.C. power is directed through a converter that converts the power to D.C. at the correct voltage to correspond to vehicle voltage. The converter may take the form of an air handler transformer and rectifier. This converter 37 powers the air handler motor.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

I claim:

1. A modular auxiliary air conditioning system for a motor vehicle having a primary air conditioning refrigerant supply and an engine coolant system, comprising:
   (a) electric air circulating means powered by low voltage direct current;
   (b) air distribution means including input and putput means and air directing means including divider means for providing a reversing air path for air for compact structure;
   (c) heating coil means in said air path, said heating coil means including means for fluid connection to said engine coolant system;
   (d) evaporator coil means in said air path, said evaporator coil means including means for fluid connection to said refrigerant supply;
   (e) said system mounted beneath the floor of said vehicle and said input and output means constructed for moving air out of and into the interior of said motor vehicle to condition said air by moving it past said heating coil means and said evaporator coil means; and in which said reversing air path provides air flowing in a first direct through a first portion of said heating coil means and a first portion of said evaporator coil means, said air then flowing in a second, reverse direction through a second portion of said heating coil means and a second portion of said evaporator coil means.

2. A modular auxiliary air conditioning system for a motor vehicle having a primary air conditioning refrigerant supply and an engine coolant system, comprising:
   (a) electric air circulating means powered by low voltage direct current;
   (b) air distribution means including input and output means and air directing means including divider means for providing a reversing air path for air for compact structure;
   (c) heating coil means in said air bath, said heating coil means including means for fluid connection to said engine coolant system;
   (d) evaporator coil means in said air path, said evaporator coil means including means for fluid connection to said refrigerant supply;
   (e) said system including mounting means for mounting beneath the floor of said vehicle and said input and output means constructed for moving air out of and into the interior of said motor vehicle to condition said air by moving it past said heating coil means and said evaporator coil means; and said system further comprising a closed circuit refrigerant system including:
   an electric powered compressor and exhaust fan powered by alternating current;
   a condenser cooled by operation of said exhaust fan;
   an evaporator means and mounting means for mounting said evaporator means in said air distribution means for arranging said evaporator means in said air path for cooling independent of said primary air conditioning refrigerant supply.

3. The system according to claim 2, further comprising electric heater means in said air path for heating independent of said engine coolant system.

4. The system according to claim 3, further comprising alternating current to direct current converting means for converting high voltge alternating current of an off-the-road electric supply to said low voltage direct current to operate said air circulating means.

5. The converter according to claim 4, in which said converting means includes a transformer and rectifier.

6. A modular auxiliary air conditioning system for a motor vehicle having a primary air conditioning refrigerant supply and an engine coolant system, comprising:
   (a) electric air circulating means powered by low voltage direct currentt, including alternating current to direct current converter means for alternative operation from an alternating current source.
   (b) air distribution means including input and output means and air directing means including divider means for providing a reversing air path for air for compact structure; an electric powered compressor and exhaust fan powered by alternating current; a condenser cooled by operation of said exhaust fan; an evaporator means mounted in said air distribution means for air cooling independent of said engine refrigerant supply; and
   (c) mounting means for mounting said system beneath the floor of said vehicle and said input and output means constructed for moving air out of and into the interior of said motor vehicle to condition said air by moving it past said evaporator means.

7. The system according to claim 6, further comprising electric heater means in said air path for heating said air.

8. The system according to claim 6, further comprising evaporator coil means with refrigerant connecting means for fluid connection to said refrigerant supply, said refrigerant coil means being mounted in said air path for cooling with engine power.

9. The system according to claim 8, further comprising heating coil means mounted in said air path for fluid connection to said engine coolant system for heating with engine power.

10. The system according to claim 7, further comprising: evaporator coil means mounted in said air path, said evaporator coil means including connections for connecting to said refrigerant supply; and heating coil means mounted in said air path for fluid connection to said engine coolant system, wherein said system is constructed for addition of said evaporator coil means and said heating coil means to said system.

* * * * *